Jan. 9, 1934.        J. N. D'ESTE ET AL        1,942,917
HEAT INSULATED PAPER BAG AND METHOD OF MAKING THE SAME
Filed July 25, 1931        2 Sheets-Sheet 1
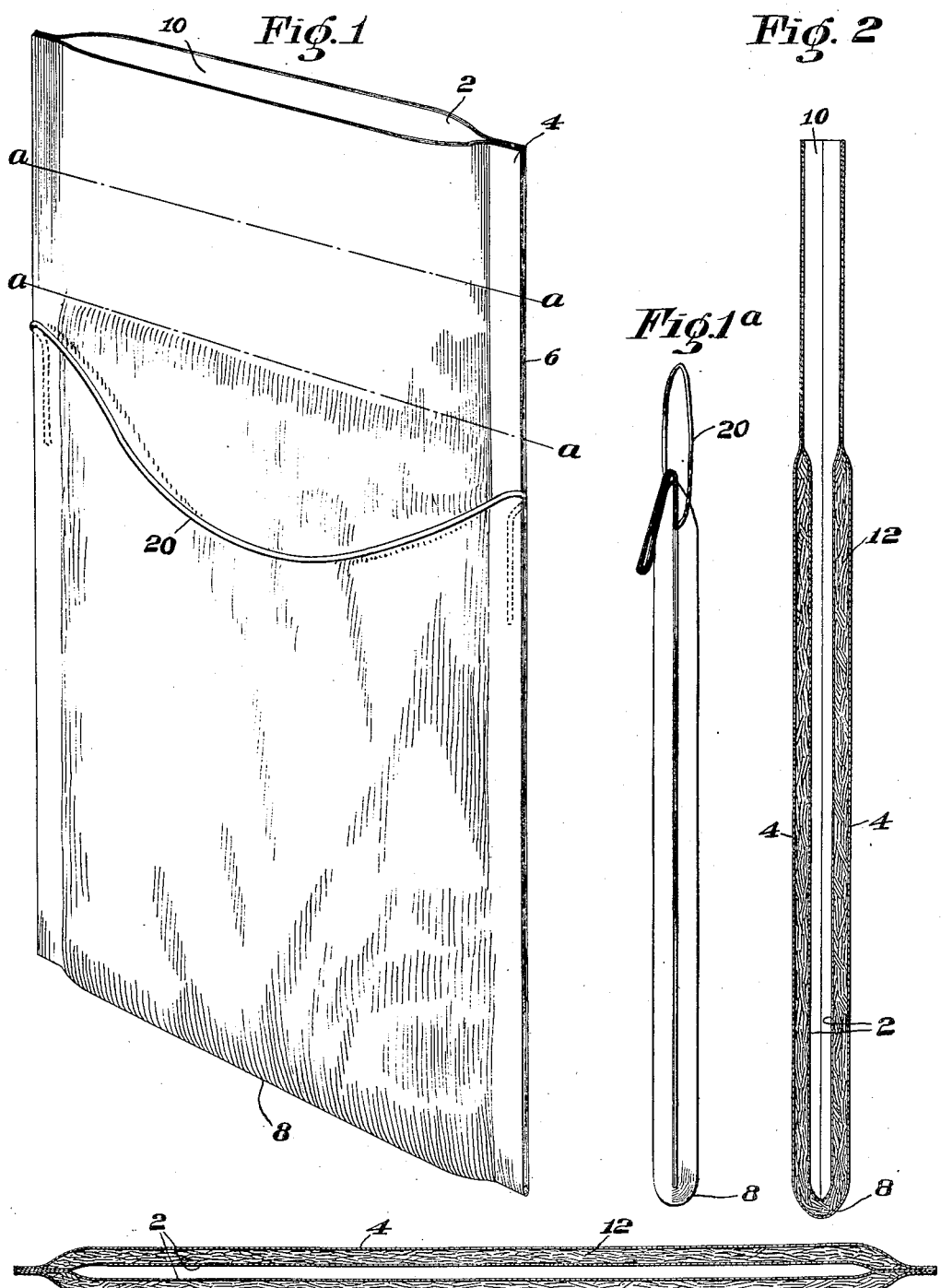
INVENTORS
John N. d'Este
William R. Tower

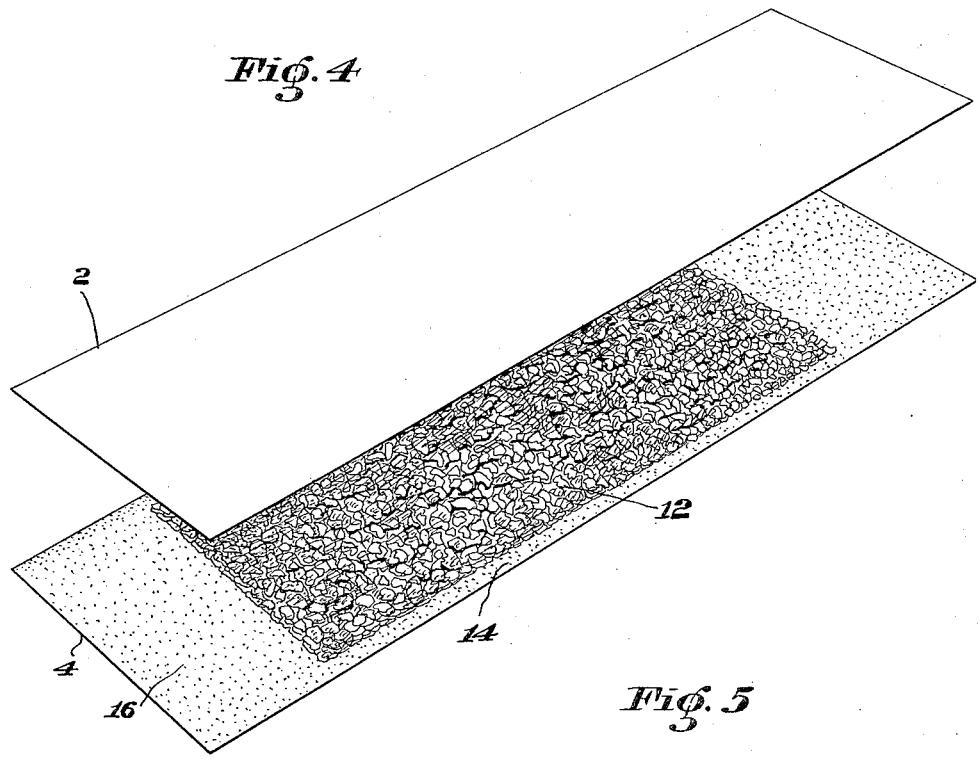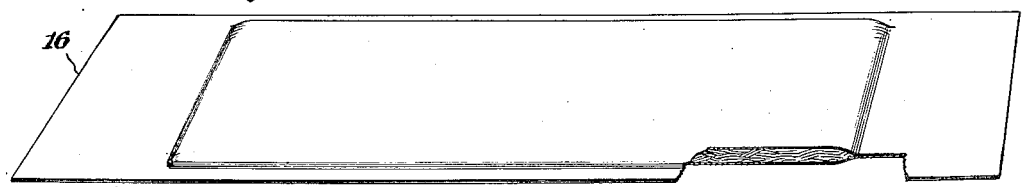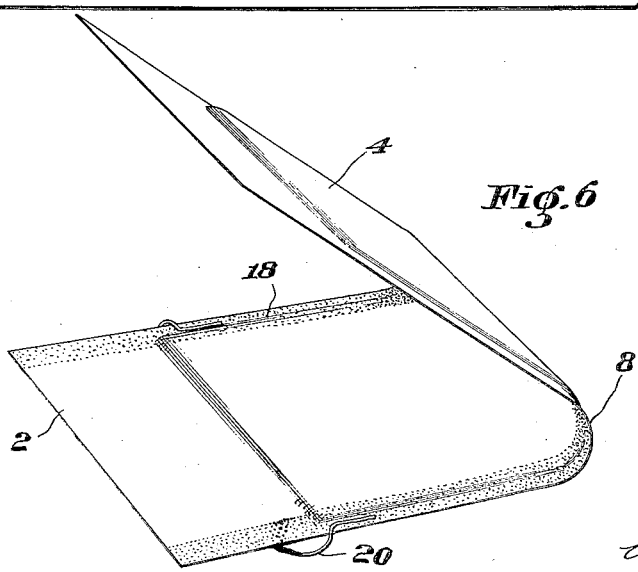

Patented Jan. 9, 1934

1,942,917

UNITED STATES PATENT OFFICE 1,942,917

HEAT-INSULATED PAPER BAG AND METHOD OF MAKING THE SAME

John N. d'Este, Milo, Maine, and William R. Tower, Newton, Mass., assignors to Jiffy Pad and Excelsior, Inc., Boston, Mass., a corporation of Delaware Application July 25, 1931. Serial No. 553,096

9 Claims. (Cl. 229—53)

This invention relates to a new and improved means for protecting and maintaining in desired condition perishable food stuffs or the like, and has particularly to do with a novel heat-insulated paper bag for holding and transporting food stuffs, hot or cold, and the method of making said bag.

The invention finds its chief use in connection with the sale and preservation of ice cream and other frozen products, providing a convenient and inexpensive means for maintaining frozen products in proper condition during transportation and until used, after which it can be thrown away. For this purpose the bag may be used with or without "dry ice" (solid carbon dioxide) according to the length of time it is desired to keep the interior of the bag at a relatively low temperature. It has been found in practice that the bag is a particularly effective means for maintaining food stuffs at desired temperature.

The invention possesses many advantages over present methods of ice cream distribution in that no return calls are required to collect the usual can and bucket, and no ice or salt have to be disposed of. The ice cream can be easily and quickly dispensed and stowed in the bag as required. There is a considerable saving in material, space, time and trouble in handling and packing, as compared with iced containers or the box-like containers in which dry ice has sometimes been employed as a refrigerant. Moreover, all these advantages are secured at a relatively low cost, for the herein described heat-insulating bag can be cheaply and quickly made from various low-grade materials such as jute waste, cotton waste, or waste paper, for example, newspapers.

More particularly the bag is of the flat envelope type, which may be readily stacked with other similar bags.

In the drawings, which show the preferred form of bag and method of making the same,—

Fig. 1 is a perspective view of the bag open and in position to receive food stuffs;

Fig. 1a is a perspective view, reduced in size, and shows the end extension folded downwardly to close the bag;

Fig. 2 shows a vertical cross-section of the bag of Fig. 1;

Fig. 3 is a horizontal cross-section of the bag of Fig. 1;

Fig. 4 is a perspective view and shows the initial step in the preferred method of making the bag;

Fig. 5 shows the pad formed by attaching the top and bottom layers of paper of Fig. 4 with the insulating material therebetween and ready for making into bag form; and Fig. 6 shows the pad of Fig. 5 after the application of additional adhesive material and cord handle, ready to be folded and pressed together so as to attach the side edges of the double walled bag and attach the handle in position.

Referring to the drawings, (particularly Figs. 1 to 3) in which like numerals represent like parts, the inner wall of the bag is formed of a substantially rectangular sheet of paper 2 and the outer wall formed of a similar sheet of paper 4, the two sheets of paper being in juxtaposed and folded relationship with their side edges attached at 6, with the fold 8 at the bottom, the upper or open end of the bag being at 10. Between the inner and outer walls of the bag and surrounding the inner wall is contained a relatively thick layer of insulating material 12, which may be a bat or filler of any suitable flexible fibrous heat-insulating material such as jute waste, cotton waste, or waste paper, but preferably consists of particles of partially disintegrated paper and of completely disintegrated paper, as described and claimed in the application of August Gerard and Maurice Weisman, Serial No. 276,303, filed May 9, 1928. This material has, in practice, been found to provide a particularly efficient heat-insulating medium.

Referring to Figs. 4-6, there is illustrated the preferred method of manufacture of the bag in which the insulating material is deposited upon the sheet of paper 4, leaving the paper 4 uncovered at the ends and along the longitudinal edges thereof. Following the deposit of the insulating material on the sheet 4, the sheets 2 and 4 are attached together along their side margins and ends, for example by adhesive material applied thereto in the uncovered areas along the side margins 14 and ends 16. Preferably, to hold the insulating material in place as well as attach the side margins and ends an adhesive material is applied to the entire under surface of the sheet 2 so that the insulating material is attached to the sheet 2 and thereby held in layer formation. The upper sheet 2 is then brought down upon the lower sheet in juxtaposed relation and attached thereto by means of the adhesive. Thus, a closed-edge double wall pad is formed, as shown in Fig. 5. The pad is then ready for the application of further adhesive material and folding into bag form.

In the manufacture of the bag as shown, the adhesive material is applied in stripes 18, somewhat wider than as shown at 14 in Fig. 4, so as to attach together the margins of the folded sheet 2 on lines within the previously attached margins of the contacting faces of the sheets 2 and 4, and thus permit the insulation 12 to surround the inner bag, as best shown in Fig. 3.

Any suitable form of handle may be employed, though in practice it has been found satisfactory to extend a cord 20 between the adjacent contacting margins of the sheet 2, so that it is held therebetween by means of the same adhesive which holds said edges together, as clearly shown in Fig. 6. It is also satisfactory to attach the handle by metallic clips. The bag as described, is now complete (as shown in Fig. 1) and ready for use, for example, by the insertion of a quantity of ice cream and with or without dry ice therein. Following the loading of the bag, the upper and uninsulated portion (formed by the extensions 16) may be folded downwardly approximately on the lines a—a and outside of the bag preferably below the cord handle (see Fig. 1a), so as to seal off the inner bag from the outside air and minimize heat transfer, except through the insulated walls thereof.

Having described our invention, what we wish to claim and secure by Letters Patent is:—

1. A heat-insulated bag for perishable food stuffs comprising layers of paper folded upon themselves and attached together at two unfolded edges to form a bag with an outer wall of paper and an inner wall of paper, said outer and inner walls containing and enclosing therebetween a layer of flexible fibrous heat-insulating material substantially surrounding said inner wall.

2. The method of making a heat-insulated bag for perishable food stuffs which consists in first forming a double walled heat insulating pad comprising layers of paper confining flexible fibrous heat-insulating material therebetween, then folding said pad upon itself, and affixing together two free edges of said pad to form a bag with a folded bottom and having an inner wall and an outer wall, said walls being separated from one another adjacent and along the side edges and bottom of said bag by a substantial thickness of said heat-insulating material.

3. The method of making a heat-insulated bag for perishable food stuffs which consists in first forming a double walled heat-insulating pad comprising adhesively attached layers of paper having flexible fibrous heat-insulating material therebetween, then folding said pad upon itself and adhesively affixing together two free edges of said pad to form a bag with a folded bottom and having an inner wall and an outer wall, said walls being separated from one another adjacent and along the side edges and bottom of said bag by a substantial thickness of said heat-insulating material.

4. A heat-insulated bag for perishable food stuffs comprising layers of paper formed and united to provide a bag with an outer wall of paper and an inner wall of paper, said outer and inner walls containing and enclosing therebetween a layer of flexible fibrous heat-insulating material substantially surrounding said inner wall, said inner wall adjacent the side edges of the bag being separated from said outer wall by a substantial thickness of said heat-insulating material.

5. A heat-insulated bag for perishable food stuffs comprising layers of sheet material formed and united to provide a bag, having inner and outer walls, and a layer of flexible fibrous heat-insulating material between said inner and outer walls and substantially surrounding said inner wall, said inner wall having edge portions secured in face to face contact to said outer wall thereby to confine said layer of insulating material within the bag.

6. A heat insulated bag for perishable food stuffs, comprising a double walled envelope bag formed of layers of paper associated and folded together, said walls containing and enclosing therebetween a layer of flexible fibrous heat insulating material, said inner wall adjacent the side edges of the bag being separated from said outer wall by a substantial thickness of said heat insulating material.

7. A heat insulated bag comprising layers of paper having a flexible fibrous heat insulating material therebetween, said layers being folded together and united to provide a double walled bag, the walls of which contain and enclose therebetween, the insulating material.

8. A heat insulated bag comprising layers of paper having a flexible fibrous heat insulating material including disintegrated paper therebetween, said layers being folded together and united to provide a double walled bag, the walls of which contain and enclose therebetween, the insulating material.

9. A heat insulated bag comprising layers of paper having a flexible fibrous heat insulating material including disintegrated newspaper therebetween, said layers being folded together and united to provide a double walled bag, the walls of which contain and enclose therebetween, the insulating material.

JOHN N. D'ESTE.
WILLIAM R. TOWER.